Oct. 1, 1974
J. B. WINDLE III
3,839,414
DIMETHYL TEREPHTHALATE MANUFACTURING PROCESS
Filed Feb. 3, 1970
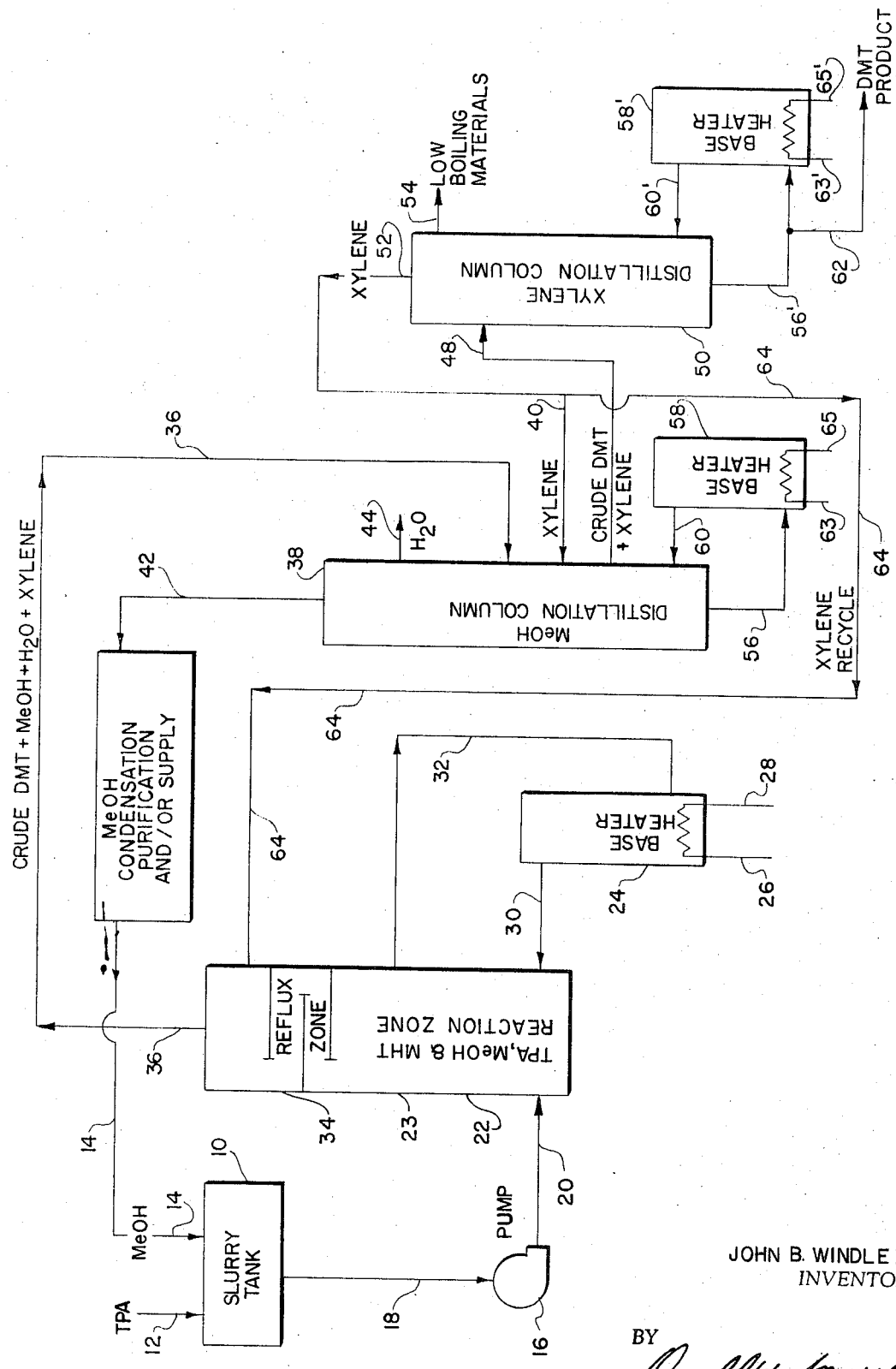
JOHN B. WINDLE III
INVENTOR.
BY
*Donald W. Spurrell*
ATTORNEY

United States Patent Office 3,839,414
Patented Oct. 1, 1974

3,839,414
DIMETHYL TEREPHTHALATE MANUFACTURING PROCESS
John B. Windle III, Kingsport, Tenn., assignor to Eastman Kodak Company, Rochester, N.Y.
Filed Feb. 3, 1970, Ser. No. 8,256
Int. Cl. C07c 67/00, 69/82
U.S. Cl. 260—475 R          3 Claims

ABSTRACT OF THE DISCLOSURE

In a process for producing dimethyl terephthalate (DMT) in a reactor having a reflux zone, and a reaction zone to which terephthtalic acid (TPA) and methanol are fed to produce DMT, water and methyl hydrogen terephthalate (MHT) vapors, the procedure comprising introducing into said reflux zone sufficient xylene (ortho, meta, or para, or mixtures thereof in any proportion) to cause condensation of a portion of the DMT vapor and MHT vapor, and contacting the further portions of the MHT vapor with the liquid DMT to condense further portions of the MHT. The DMT product vapor is taken from an upper portion of the reactor and fed along with methanol vapor, xylene vapor, water vapor, and impurities to a methanol distillation column employing xylene to control the temperature therein. DMT and xylene are then fed to a xylene distillation column wherein the xylene is distilled off for recirculation to the methanol distillation column and to the reactor reflux zone.

---

This invention relates to the production of dimethyl terephthalate, and more particularly, to a method and apparatus for dimethyl terephthalate production wherein dimethyl terephthalate is refluxed from a reflux zone to a reaction zone. The invention further concerns particular heat-exchange material introduced into the reflux zone.

A prior patent disclosing a related process for the production of dimethyl terephthalate (abbreviated as DMT) is Shaw et al. U.S. Pat. 3,227,743. According to Shaw et al., the production of DMT involves introducing a terephthalic acid (abbreviated as TPA) and methanol (abbreviated as MeOH) slurry into a reactor wherein DMT (already present) reacts with the TPA to form methyl hydrogen terephthalate (abbreviated as MHT) which then reacts with MeOH to form DMT and water.

In the process of that patent the DMT material enters an upper portion of the reactor (reflux zone) and condenses a portion of the DMT vapor traveling up the column for return and contact with the MHT vapor. The crude DMT vapor passes from the top of the reactor above the reflux zone and undergoes purification treatment in the subsequent sections of the system.

Objects of the present invention are to provide an improved, low-pressure method and apparatus for the production of dimethyl terephthalate, and to improve the economics of DMT manufacture in reducing apparatus size and heat requirements.

These and other objects hereinfater appearing have been attained in accordance with the present invention through the discovery that xylene (ortho, meta, para or mixtures thereof in any proportion, when employed as the heat-exchange material introduced into the reflux zone of the reactor in a process conducted essentially as disclosed in said Pat. 3,227,743, provides an excellent means for reducing MHT concentration in the DMT vapor product, for maintaining adequate DMT concentration in the reactor for efficient reactor operation, and allowing substantial reductions in the methanol distillation and xylene distillation requirements. The process of the present invention involves, therefore, a continuous process for the production of DMT wherein TPA and methanol are fed to a heated reactor to produce DMT and MHT vapor therein, liquifying portions of the DMT and MHT vapor with liquid xylene, and contacting the MHT vapor with the liquified DMT to further liquify the MHT vapor.

The uniqueness of liquid xylene as the heat-exchange material is manifested in its ability to function in an especially effective manner in the overall DMT manufacturing process. In this regard, the xylene has been found to exhibit a combination of properties of special importance to the overall system. For example, xylene does not thermally or chemically deteriorate, oxidize, or esterify under the conditions of its use according to this invention; its latent heat of vaporization and speific heat, and its molecular weight are such as to furnish the required fractional distillation and satisfy the heat and material balance requirements in the reactor; its vapor pressure and vapor-liquid equilibrium with DMT is such that the MeOH column can be operated at atmospheric pressure; its vapor-liquid equilibrium with respect to DMT, MeOH and water as a multicomponent system is such that an advantageous mixture of xylene, MeOH and water can be withdrawn as a sidestream from the MeOH column whereby xylene and MeOH can be returned to the column and water removed (the liquid-liquid phase equilibrium of the mixture withdrawn from the MeOH column is such as to permit removal of the water through a decantation operation); it has a sufficiently low freezing point to condense and remain in the liquid state when using conventional $H_2O$ or air-cooling condensers; moreover, it boils at a lower temperature than the methyl-p-toluate (abbreviated MPT) side stream product in the xylene column; it is easily separable by distillation from DMT; and does not form azeotropes with DMT, MPT or MFB (methyl-p-formylbenzoate).

The apparatus or system embodiment of the present invention comprises heated reactor means having reactant inlet means, product outlet means and heat-exchange material inlet means, reactant supply means, methanol distillation means, heat-exchange material distillation means, conduit means connecting said reactant supply means to said reactant inlet means, conduit means connecting said product outlet means to product inlet means in said methanol distillation means, product outlet means in said methanol distillation means connected by conduit means to product inlet means in said heat-exchange material distillation means, heat-exchange material outlet means in said heat-exchange material distillation means connected by conduit means to heat-exchange material inlet means in said methanol distillation means, conduit means communicating with said heat-exchange material outlet means and with said heat-exchange material inlet means in said reactor means, and product outlet means in said heat-exchange material distillation means.

It is, of course, understood that the various outlet means and inlet means mentioned above refer to valving and piping structure well known to those skilled in the art for handling the materials, e.g. controlling egress, ingress, flow rate, etc.

In apparatus such as that shown in the drawing, the process may be typically conducted as follows: 100 parts by weight per hour of TPA is slurried with 181 parts per hour of methanol which contains 4 parts per hour of xylene and 1 part per hour of water, and 281 parts per hour of this slurry at, for example, ambient temperature is fed to the base of the reactor. This exemplary methanol to TPA molar ratio is 10:1, however, other ratios (5:1 to 20:1) may be employed as is well known in the art. The reaction of this example is conducted at a temperature of about 300° C., and at about 95 p.s.i.g. pressure, however, the temperature may vary widely from at least about 250° C. up to about 330° C. The pressure should be maintained below about 300 p.s.i.g., i.e. as low as about 30 p.s.i.g. or lower according to the design of the system. The reaction mixture (liquid) at the top of the liquid level in the reactor consists of about 15% MHT and about 85% DMT, along with impurities. Fractionating trays in the top of vapor section of the reactor reduce the MHT content therein to a low level. In this particular example, approximately 33 parts per hour of xylene at about 20° C. (can be from 0° C. or less up to 50° C. or higher) is recycled from the xylene distillation column to the reflux section of the reactor. In general, from about 30 to about 50 parts by weight of xylene per hour is preferred, and the amount used will depend on such factors as its temperature which may be adjusted for the most convenient operation of the overall system. It is apparent that the heat input to the base heaters, as well as other operating conditions will depend to a large extent on the particular physical construction of the system. Such operating details and the manner of calculating them are well known to those skilled in the art as shown by U.S. Pats. 2,992,168 and 3,103,470.

A more complete understanding of the present invention may be had by referring to the attached drawing which is a schematic flow diagram showing an arrangement of an apparatus or system which can be used for carrying out the present process. Such apparatus is further shown in FIGS. 1 and 2 of the said Shaw et al. Pat. 3,227,743, incorporated herein by reference, and described therein, substituting the present xylene recycle system for the DMT recycle system of the patent.

As shown, TPA and methanol are fed into slurry tank 10 through lines 12 and 14, respectively. The slurry is conducted from tank 10 by pump 16 through lines 18 and 20 to reaction zone 22 of reactor means generally designated 23, which is heated by base heater 24. Base heater 24 is connected to reaction zone 22 via circulating lines 30 and 32. A plurality of distillation plates or other such structure can advantageously be located in the upper portion of the reactor means at the position marked 34 for the reflux zone. The reaction zone 22 may contain any conventional inert packing material, or be equipped with distillation plates, but is preferably an essentially hollow tube. The reaction zone 22 and reflux zone 34 may be in separated vessels connected by suitable means; however, these zones are advantageously in one vessel as indicated on the drawing.

The crude DMT vapor, methanol vapor, water vapor and xylene vapor are conducted from the reactor product outlet to methanol distillation column 38 via line 36. Column 38 structure and its operation may be that described in U.S. Pat. 3,103,470 of Wilson et al., incorporated herein by reference. Xylene as liquid enters column 38 via line 40, and methanol and water are emitted via lines 42 and 44, respectively. A portion of the recovered xylene, after condensation, is recycled via line 64 to reflux zone 34 of the reactor. Suitable valving may, of course, be included in lines 40 and 64 to adjust the xylene flow to the reactor reflux zone.

Crude DMT is conducted from the methanol distillation column through line 48 to xylene distillation column 50, from which xylene and a DMT impurity fraction are removed via lines 52 and 54, respectively. This column 50 may be of the structure and operation described in U.S. Pat. 2,992,168 of Wilson et al., incorporated herein by reference.

The combination of the present invention with the methanol distillation column of Wilson et al. 3,103,470 and the xylene distillation column and DMT column of Wilson et al. 2,992,168 may be accomplished in general by connecting line 36 of the present application to line 1 of 3,103,470, line 2 of 3,103,470 to line 12 of 2,992,168, line 5 of 2,992,168 to line 6 of 3,103,470 and line 64 of the present application to line 12 of 2,992,168.

The contents of the distillation columns 38 and 50 are readily heated, for example, by cycling through base heaters 58 and 58' via lines 56 and 56' and 60 and 60', respectively. The base heaters 24, 58 and 58' may be heated in the manner shown in the aforementioned U.S. Pat. 3,227,743. Both columns 38 and 50 may be equipped with distillation plates or a combination of such plates and inert packing material according to well-known engineering practices. The DMT removed via line 62 (corresponding to line 20 of 2,992,168) is the product of this continuous process.

Important advantages of the use of xylene as the recycled heat exchange material in place of DMT are the somewhat reduced load on the methanol column and the unexpectedly great reduction in the load on the xylene distillation column. This elimination of the DMT recycle stream (as in U.S. 3,227,743) greatly reduces the amount of DMT circulated through the columns and consequently important savings are realized from the reduced column sizes and column heating requirements. It is noted that the drawing shows xylene being used in an essentially closed system; however, it is obvious that the xylene can be taken from any of the lines shown and stored while xylene from another source is supplied. It is important also to appreciate that the use of xylene as the heat-exchange material in the reflux zone eliminates the need for purification or separation apparatus which might be required if some other material were used.

The following table illustrates the operation of the present invention and compares it with a comparable operation of the prior art as follows (parts by weight per hour):

|  | Old process, DMT recycled | New process, xylene recycled |
| --- | --- | --- |
| Reactor feed: |  |  |
| TPA (conduit 12) | 100 | 100 |
| MeOH (conduit 14) | 181 | 181 |
| Xylene (conduit 14) | 4 | 4 |
| Water (conduit 14) | 1 | 1 |
| Reactor overheads (conduit 36): |  |  |
| DMT | 195 | 139 |
| MeOH | 145 | 145 |
| H₂O | 24 | 24 |
| Xylene | 4 | 33 |
| Xylene to MeOH column (conduit 40) | 105 | 46 |
| Xylene to reactor (conduit 64) | 0 | 29 |
| Crude to xylene column (conduit 48): |  |  |
| DMT | 195 | 139 |
| Xylene | 105 | 75 |
| DMT product (conduit 62) | 116 | 116 |

The invention has been described in considerable detail with particular reference to certain preferred embodiments thereof, but it will be understood that variations and modifications can be effected within the spirit and scope of the invention as described hereinabove.

I claim:

1. In a continuous process for the production of dimethyl terephthalate wherein terephthalic acid and methanol are fed to a heated reactor means maintained at a temperature of from about 250° C. to about 330° C. and at a pressure of below about 300 p.s.i.g. to produce dimethyl terephthalate and methyl hydrogen terephthalate vapors therein which enter a reflux zone, the improvement comprising feeding liquid xylene to said reflux zone and condensing a portion of said dimethyl terephthalate vapor and said methyl hydrogen terephthalate vapor with said liquid xylene, and condensing substantially all of the remaining portions of said methyl hydrogen terephthalate vapor by contacting the same with said condensed dimethyl terephthalate in said reflux zone.

2. The process of Claim 1 wherein the xylene which is vaporized in said reaction zone is conducted along with dimethyl terephthalate vapor, methanol vapor and water vapor to a methanol distillation zone wherein the presence of xylene serves to maintain a temperature below about 190° C.

3. The process of Claim 2 wherein xylene and dimethyl terephthalate from the methanol distillation column are conducted to a xylene distillation zone from which a portion of the distilled liquid xylene is split into two streams, one of which is conducted to a methanol distillation zone, and the other to the reactor to condense dimethyl terephthalate vapor and methyl hydrogen terephthalate vapor as aforesaid.

References Cited

UNITED STATES PATENTS

| | | | |
|---|---|---|---|
| 3,172,904 | 3/1965 | Rehfuss | 260—475 |
| 3,227,743 | 1/1966 | Shaw et al. | 260—475 |
| 3,288,842 | 11/1966 | Verdol | 260—475 |
| 3,476,796 | 11/1969 | Kudu et al. | 260—475 |

LORRAINE A. WEINBERGER, Primary Examiner

R. D. KELLY, Assistant Examiner

U.S. Cl. X.R.

23—288 A